J. JONSON.
Float-Valves for Horse-Troughs.

No. 138,659.

2 Sheets--Sheet 1.

Patented May 6, 1873.

Witnesses,
Fred Haynes
A. P. McNiel

Julius Jonson

AM. PHOTO-LITHOGRAPHIC CO. N.Y. (OSBORNE'S PROCESS)

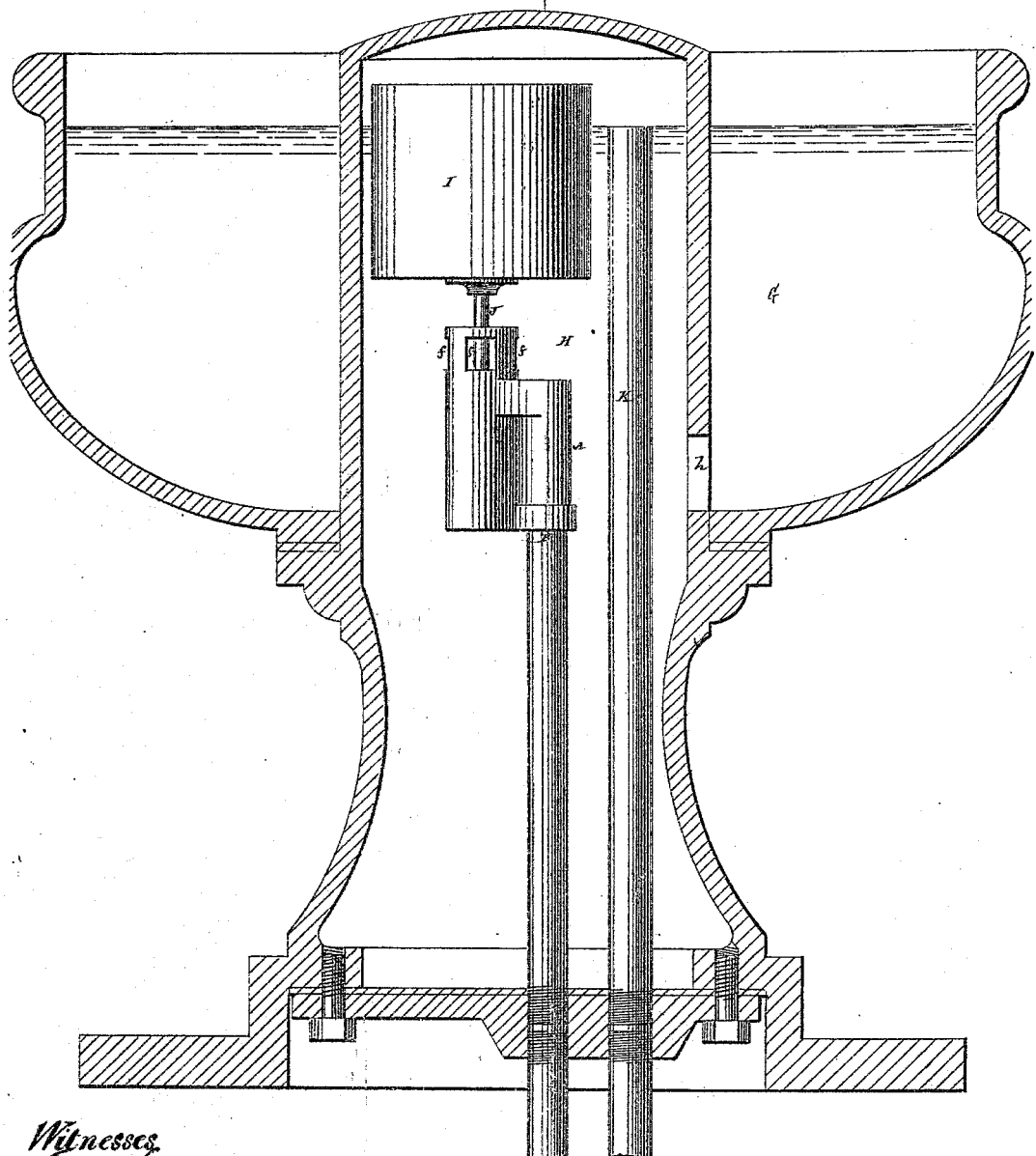

UNITED STATES PATENT OFFICE.

JULIUS JONSON, OF NEW YORK, N. Y., ASSIGNOR TO IRAH CHASE, OF SAME PLACE.

IMPROVEMENT IN FLOAT-VALVES FOR HORSE-TROUGHS, &c.

Specification forming part of Letters Patent No. 138,659, dated May 6, 1873; application filed August 17, 1872.

*To all whom it may concern:*

Be it known that I, JULIUS JONSON, of the city, county, and State of New York, have invented a new and useful Improvement in Float-Valves for Horse-Troughs, Drinking-Hydrants, Water-Closets, and other purposes; and I do hereby declare that the following is a full, clear, and exact description of the same, reference being had to the accompanying drawing forming part of this specification, and in which—

Figure 3:
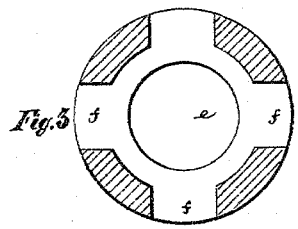
Figure 2:
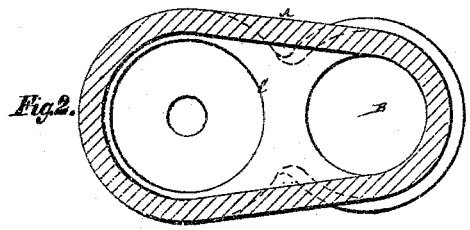
Figure 1:
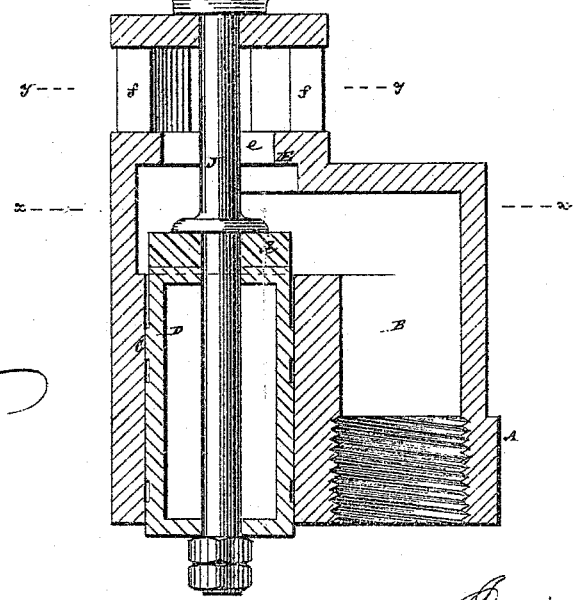

Figure 1 represents a partly-sectional elevation of my improved float-valve; Fig. 2, a horizontal section of the same at the line $x\ x$; Fig. 3, a horizontal section at the line $y\ y$. Fig. 4 is a sectional elevation, showing the application of the valve to a horse-trough.

Similar letters of reference indicate corresponding parts throughout the several figures.

My invention consists in a peculiar construction of valve and arrangement of the same relatively with inlet and outlet passages and with the float by which the valve is lifted, whereby a balanced action is obtained for the valve, the action of the same is made positive and reliable whenever the water in the chamber which the valve serves to supply is changed from its proper level, and a compact disposition of parts, suitable for horse-troughs, hydrants, and other purposes, is effected.

A represents a lower casting, constructed with an inlet, B, for the supply of water under pressure, and with a cylindrical chamber or passage, C, for a cylindrical valve, D, to play up and down within. Said valve, which may be suitably packed at its periphery, is of greater length than the stroke of it, so that when rising it does not leave the cylinder C open to passage of water from the inlet B to act upon the under side of the valve or to escape by the cylinder, the supply of water by the inlet B being wholly restricted to the space above the valve. Said valve D is mounted on its upper end with a rubber disk, $d$, which constitutes the valve-facing, and which, when the valve is fully lifted, closes against a seat, E, to prevent the egress of water. When the valve drops, however, then a free passage is provided for the water through an opening, $e$, in the valve-seat, and by side orifices $f\,f$, to the trough G, chamber, or vessel to be supplied with water by the inlet B, or to a pipe or casing, H, in communication, by orifices $h$, with said trough and inclosing the valve, its case, and inlet-pipe within the trough, as also inclosing a copper float, I, by which the valve is balanced or buoyed, said float being connected with the valve by a stem, J, arranged to pass down through the valve and attached to it so as to insure the float and valve rising and falling in common. An overflow-pipe, K, may be provided, if desired.

This construction and arrangement of parts is at once compact and efficient, the valve is quick and lively in its action, readily responding to any deviation from the proper level of the water in the trough, vessel, or chamber it is required to regulate the supply to, and such valve is perfectly balanced or relieved from all pressure tending to prevent its opening or closing again.

What is here claimed, and desired to be secured by Letters Patent, is—

The combination of the elongated cylindrical valve D, having a rubber facing, $d$, the cylinder C, the inlet B, the valve-seat E, the outlet $e$, the float I, and the connecting-stem J, when constructed and arranged in relation with each other, substantially as and for the purposes herein set forth.

JULIUS JONSON.

Witnesses:
GEORGE F. DOAK,
JOHN C. CAMPBELL.